Aug. 4, 1970    H. M. PYRON    3,522,623
POULTRY KILLING MACHINE
Filed Feb. 6, 1968    3 Sheets-Sheet 2

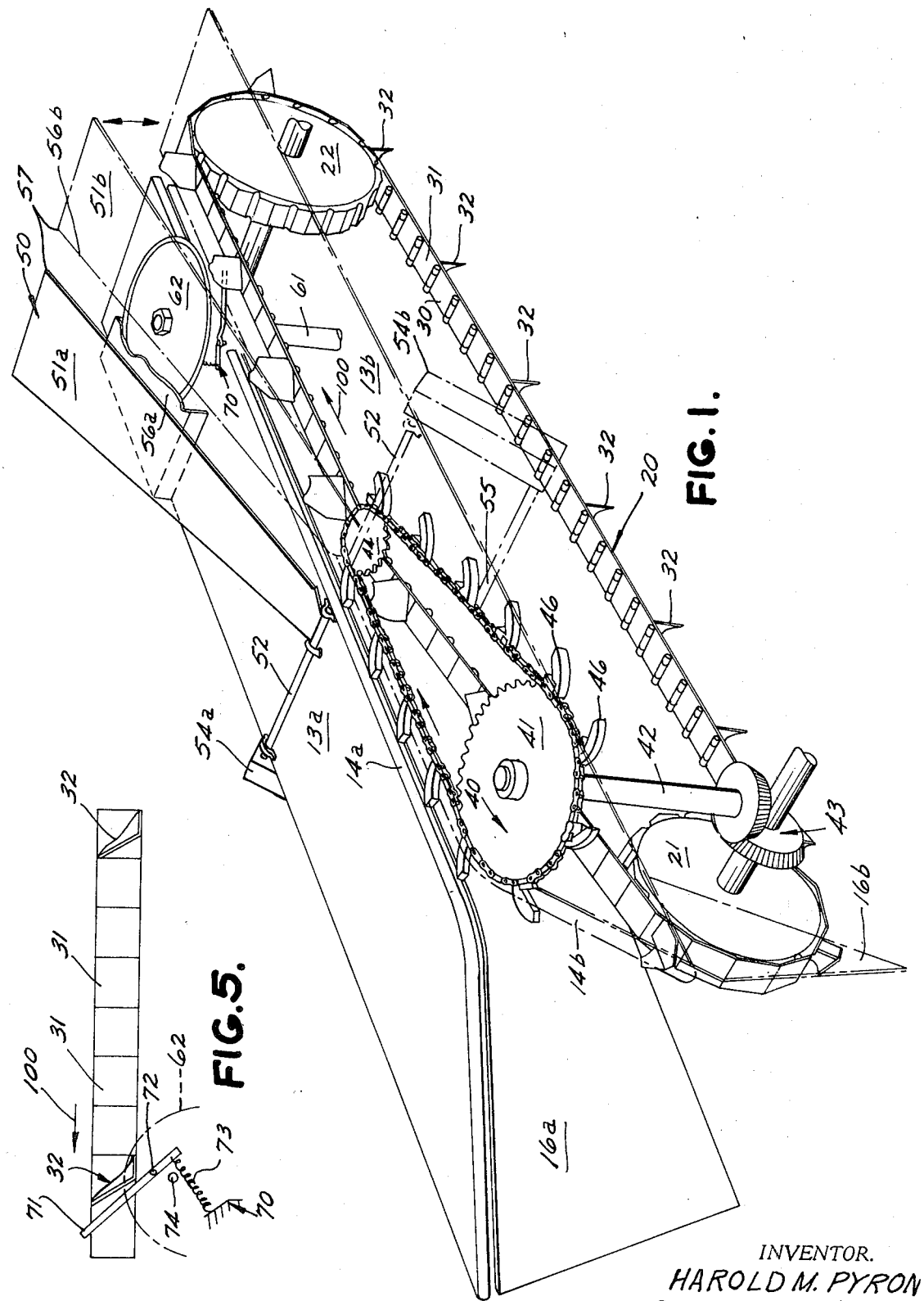

INVENTOR.
HAROLD M PYRON
BY Price Heneveld
Huizenga & Cooper

Aug. 4, 1970    H. M. PYRON    3,522,623
POULTRY KILLING MACHINE
Filed Feb. 6, 1968    3 Sheets-Sheet 3
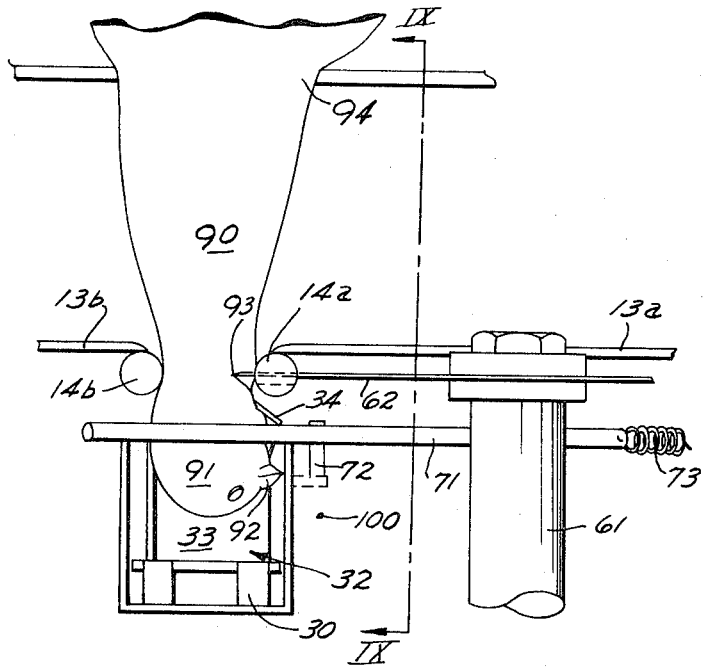
FIG. 8.
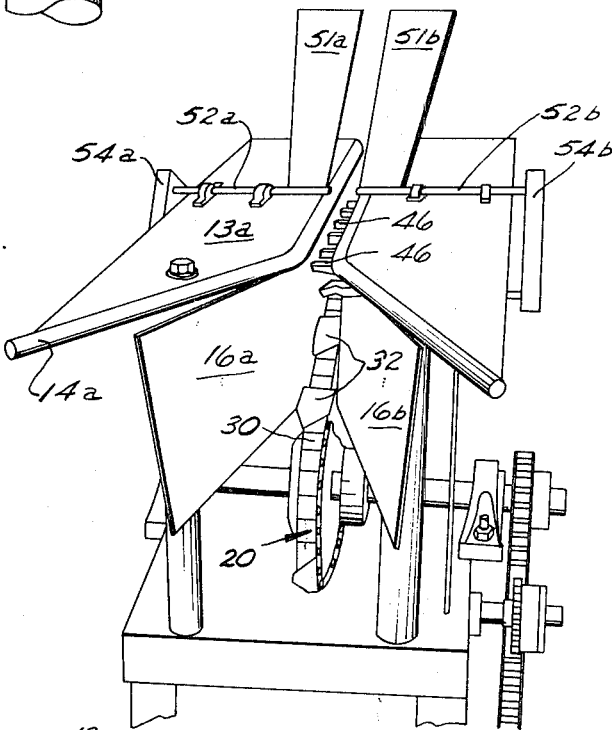
FIG. 4.
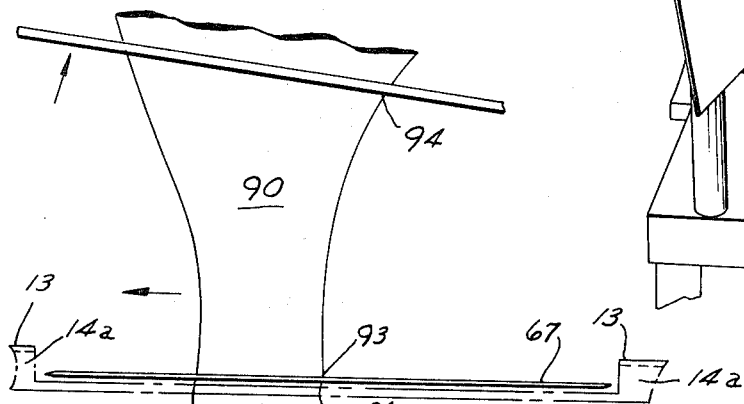
FIG. 9.
INVENTOR.
HAROLD M. PYRON
BY 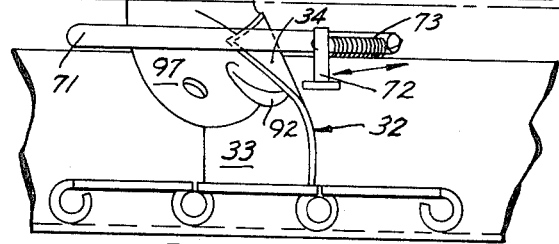

United States Patent Office 3,522,623
Patented Aug. 4, 1970

3,522,623
POULTRY KILLING MACHINE
Harold M. Pyron, Macon, Ga., assignor to International Agri Systems, Inc., Ottumwa, Iowa, a corporation of Iowa
Filed Feb. 6, 1968, Ser. No. 703,392
Int. Cl. A22b 3/08
U.S. Cl. 17—11                                21 Claims

ABSTRACT OF THE DISCLOSURE

A poultry killing machine for killing poultry suspended from a traveling overhead conveyor having an elongated conveyor positioned below the overhead conveyor with spaced head-receiving members. As the bird is fed into the machine, its head is engaged by one of the receiving members such that it is propelled therefrom by both the main and overhead conveyors. The head-receiving member is shaped such as to position the head in a predetermined manner and the bird is carried into cutting relationship with respect to a spinning circular cutting blade which functions to sever a portion of the bird's neck. Prior to coming into engagement with the cutting member, the body section of the bird travels up a resiliently inclined ramp which, in conjunction with a pair of spaced beads adapted to vertically position the bird's head, compensates for different sized birds automatically within the apparatus. It is understood that this abstract is not to be utilized to limit the scope of this invention.

---

This invention relates to poultry killing machines and, more particularly, to a machine particularly adapted to automatically sever a portion of the neck of poultry as they pass therethrough while suspended from an overhead conveyor.

In the past few years, poultry processing plants have been forced by competitive conditions to markedly reduce the manual labor required for the processing of the birds. Machines have been built, for example, which are capable of automatically defeathering, dehocking and eviscerating the poultry during their passage through the processing facility.

One of the problems which has plagued poultry processors in their stride toward complete automation has been the complete lack in the art of any machine which is capable of killing the birds automatically in such a manner that a thorough bleeding of the carcass is achieved. It is customary to stun the birds by an electrical charge or the like initially upon their entry into the processing facility. Thereafter, the neck portions of the bird must be severed in such a manner as to permit the blood to flow from the carcass thereof. Proper blood drainage standards dictate that the bird must be cut at a rather specific location on its neck and the unavailability of a mechanical apparatus heretofore capable of effectively and efficiently accomplishing such severing has required the utilization of manual labor to accomplish the actual slitting operation.

Facilities of the type described, ordinarily, are equipped with overhead conveyors which travel from processing station to processing station, the birds being suspended by means of shackles therefrom. It has been customary in the past for the poultry killers to position themselves along the initial portion of the overhead conveyor in order that they may slit the neck of each bird as it passes by them.

The need for an apparatus capable of automatically slitting the birds at the neck has not gone unnoticed. There have been proposed, for example, a number of varying types of machines for executing this step in the processing operation. None of these machines has achieved success because of the inability to accurately position birds of varying sizes in predetermined relationship with respect to the cutter mechanism and thus cuts are made consistently at the wrong locations such that the bird does not drain properly. Processors have been forced, thus, to continue manual methods of killing despite the rather large amount of expense and other problems involved in providing laborers to effect the killing operation.

It is an object of this invention, therefore, to provide an automatic poultry killing apparatus and method.

More particularly, it is an object of this invention to provide such an apparatus and method which is capable of properly positioning the bird with respect to a cutting member despite variations in the size, weight or other characteristics of the bird.

It is an object of this invention, additionally, to provide such an apparatus and method capable of operation in conjunction with a standard processing facility overhead conveyor, thus obviating the necessity of removing birds from the conveyor for the killing thereof.

It is an object of this invention, thus, to provide an apparatus and method which will reduce markedly the expense of poultry processing while, additionally, reducing the problems which are encountered in providing skilled technicians on the processing line.

These as well as other objects of this invention will be readily apparent to those skilled in the art from the following specification and accompanying drawings in which:

FIG. 1 is a perspective view of the working portion of the apparatus having the front apron and platform or cover shown in phantom only to expose the interior mechanisms thereof;

FIG. 4 is a perspective, front-elevational view of the novel killing apparatus;

FIG. 5 is a schematic illustration of the head retainer and main-conveyor chain assemblies;

FIG. 8 is a rear-elevational view of the cutting portion of the apparatus with a bird suspended therein; and FIG. 9 is a fragmentary, cross-sectional view taken along plane IX—IX of FIG. 8.

Figure 3:
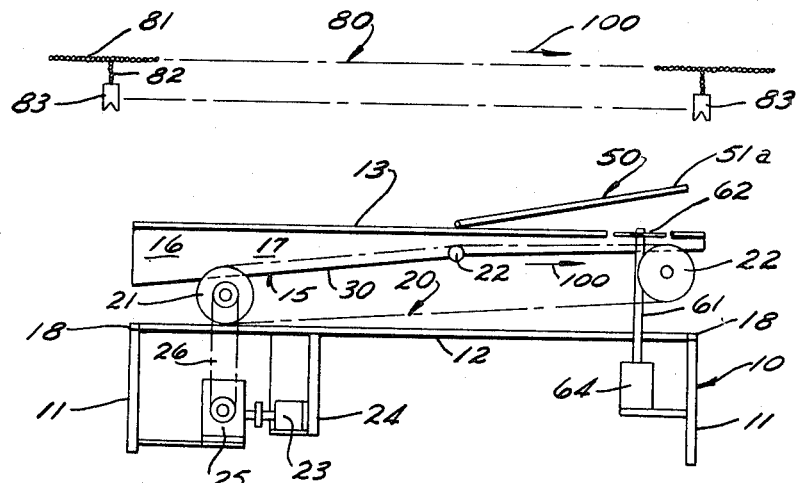
FIG. 3 is a schematic, fragmentary side-elevational view of the apparatus illustrating its operative position with respect to an overhead conveyor assembly.

Briefly, this invention comprises an apparatus and method for killing poultry suspended in head-down fashion from a traveling overhead conveyor by suspension means such as shackles affixed to the overhead conveyor for movement therewith. The apparatus includes a second or main conveyor spaced below the overhead conveyor, the second conveyor having a series of head-carrier means affixed thereto for movement therewith. One of the carrier means is positioned generally below each of the suspension means or shackles and means are provided for moving the second conveyor at a lineal speed approximately equal to that of the overhead conveyor. Cutting means are provided adjacent the second conveyor for cutting the birds at the neck as they are propelled thereby by the overhead and second conveyors.

Referring now to the figures, a preferred embodiment of this invention will be described in detail. FIGS. 1 through 4 illustrate the apparatus which comprises a frame assembly 10 having uprights 11, longitudinal supports 12 and conventional horizontal supports 18. Suspended above the longitudinal supports 12 by any conventional means such as vertical pipe extensions or the like (not shown) are a lefthand upper decking 13a and a righthand upper decking 13b. The facing edges of deckings 13 have elongated beads 14a and 14b, respectively, affixed thereto which, for example, can comprise one-half inch round stainless steel stock. Extending downwardly from the beads 14 are the guide apron assemblies 15a and 15b which comprise, respectively, converging sections 16a and 16b and longitudinal sides 17a and 17b. The upper decks 13 and beads 14 converge sufficiently close along the major portion of the length of the apparatus to retain the head of a bird therebeneath despite the exertion of upward pressure thereagainst as will be described in detail hereinafter. The input section of the apparatus converges into the rather narrow slot in V-shaped fashion as shown best in FIG. 4.

Positioned below the platforms 13 is the main conveyor assembly 20 which comprises a drive sprocket 21 and idler sprockets 22. The sprockets are journalled in suitable fashion within the apparatus and power is supplied to the drive sprocket from a motor 23 and right-angle drive 25 via a conventional chain drive assembly 26. The motor, conveniently, can be suspended from a suitable frame 24 and either the motor or drive assembly, preferably, incorporates a variable speed mechanism such that the speed of the main conveyor assembly 20 may be synchronized with that of the overhead conveyor to be described hereinafter.

Figure 7:
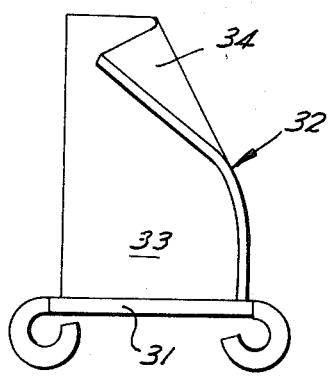
FIG. 7 is a side-elevational view of the head retaining and positioning mechanism.
Figure 6:
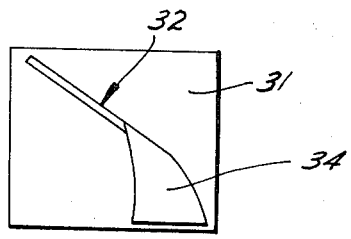
FIG. 6 is a plan view of the head retaining and positioning mechanism.

Passing about the drive sprocket 21 and the idler sprockets 22 in conventional fashion is the main conveyor chain 30 which follows an upwardly inclined path as shown in FIG. 3, from the left side to the proximate middle of the apparatus and then levels out to complete its upper travel through the apparatus. The conveyor chain 30, as shown best in FIGS. 5, 6 and 7, comprises a series of planar links 31 having a series of head carrier and positioner members 32 affixed thereto. Each of the head carrier and positioner members 32 comprises a generally planar section 33 welded or otherwsie affixed to the link 31 such that it lies in a vertical plane which is transverse (preferably at an angle of approximately 45°) to the direction of movement of the conveyor chain 30. The upper, knife-adjacent corners of the members 32 are bent forwardly in the direction of travel of the conveyor chain as indicated by the reference numeral 34 such that a pocket is formed therein, the pocket, as will be described in more detail hereinafter, being adapted in conjunction with other portions of the machine to positively position the bird's head for the cutting operation.

The infeed guide assembly 40, shown best in FIG. 1, comprises a drive sprocket 41 affixed to a shaft 42 which is driven via a suitable pinion gear assembly 43 from the shaft of main conveyor sprocket 21. The infeed guide assembly 40 is provided, additionally, with a suitably journalled idler sprocket 44, and a chain 45 is passed therearound as well as around drive sprocket 41 in endless fashion. Chain 45 has a series of protruding guide fingers 46 projecting from the exterior periphery thereof and the positioning of the sprockets 41 and 44 is such that the fingers 46 extend into and travel along the poultry path between beads 14a and 14b, but slightly therebelow as shown best in FIG. 4. The size of sprocket 41 and the characteristics of pinion gear assembly 43 are such that the fingers 46 travel at approximately the same lineal rate as do the main conveyor assembly 20 and the overhead conveyor assembly to be discussed hereinafter.

Affixed to the upper decks 13a and 13b in proximate vertical registry with the termination of the infeed guide assembly 40 is the pressure plate assembly 50. This assembly comprises a pair of plates 51a and 51b pivotably affixed to the platforms or decks 13a and 13b respectively by means of shafts 52. The shafts 52a and 52b are rotatably positioned upon platforms 13a and 13b, respectively, by means of bearing blocks or the like 53 and the plates 51 are welded or otherwise affixed directly thereto for rotation therewith. The outer extremities of the shafts 52 carry counterweights 54a and 54b which tend to bias the plates 51 into the upwardly inclined, ramp-like configuration illustrated in FIGS. 1 and 3. Counterweights 54, preferably, are slaved for movement together by means of a tie rod 55 such that both plates 51a and 51b are always in the same angular relationship with respect to platforms 13a and 13b. This may be accomplished, as illustrated partially in FIG. 1, by running the tie rod 55 through the interior of the frame of the apparatus between the downward extremities of the weights 54. The interior edges 56 of the plates 51a and 51b are parallel and spaced symmetrically with respect to a vertical plane passing between beads 14a and 14b. The spacing between the plates 51, indicated generally by the reference numeral 57 in FIG. 1, is slightly greater preferably than the spacing between the beads 14 as will become apparent hereinafter.

The knife assembly, indicated generally by the reference numeral 60, comprises a suitably pournalled vertical shaft 61 having a circular cutting blade or saw 62 affixed to the upper extremity thereof. The shaft is positioned such that the interior periphery of the blade 62 extends into the bird path between the beads 14a and 14b a sufficient distance to cut the neck of the bird to the desired depth. The non-working portions of the periphery of blades 62 are covered by a guard 63 and a suitable motor 64 is provided to impart rotation to the shaft 61 and, thus, the circular cutting blade 62.

As illustrated in FIGS. 8 and 9, the vertical position of the knife blade or saw 62 is approximately at the midpoint of the beads 14. This necessities, of course, a break in bead 14a at the knife location as illustrated in FIG. 9.

The head retainer assembly, indicated generally by the reference numeral 70, comprises an elongated bar 71 suitably pivoted as indicated at 72. As shown in FIGS. 5, 8 and 9, the reach of bar 71 extends across the path of the main conveyor 20 in such a manner that the bar 71 is repeatedly struck by the upper sections of head carrier and positioners 32 and the poultry head therein. The bar 71 pivots out of contact with members 32 and returns repeatedly to its original position in abutment with stop 74 under the influence of tension spring 73. As will be described hereinafter, bar 71 functions to maintain the head of the bird at the proper location within positioning members 32 during the cutting operation and, thus, it is placed adjacent the circular knife or saw 62 in the manner illustrated in FIGS. 5, 8 and 9.

The killing apparatus is adapted particularly for use in conjunction with an overhead conveyor of the type ordinarily found in processing facilities. More specifically, as illustrated in FIG. 3, the overhead conveyor assembly 80 can comprise an elongated chain or cable 81 having a series of shackles 83 suspended therefrom by means of flexible links 82. Birds are suspended from the shackles 83 by their hocks and propelled from station to station within the plant by movement of the overhead cable 81. With the apparatus positioned as illustrated in FIG. 3, i.e. with the knife 62 and turned-over portions 34 of members 32 positioned toward the rear side of the machine, the bird should be hung preferably such that the breasts face the viewer of FIG. 3. The birds 90 are propelled through the apparatus in the direction indicated by the arrow 100 throughout the drawings, the exposed portion of infeed guide assembly 40, the main conveyor assembly 20 and the overhead conveyor assembly 80 all moving in identical lineal directions.

As the birds are brought into initial contact with the killing apparatus by the overhead conveyor assembly 80, they are guided into the central channel between the beads 14a and 14b by means of the converging sections 16a and 16b of guide aprons 15. As the birds pass into the apparatus, their necks are abutted and pushed along by the fingers 46 protruding from the infeed guide assembly 40, which fingers as has been pointed out previously move at approximately the same lineal rate as the overhead conveyor assembly 80 and the main conveyor assembly 20. During that portion of the bird's travel through the apparatus in which it is engaged by the fingers 46, the conveyor chain 30 is rising, because of its upwardly inclined path, into vertical registry with the head of the bird and the head is eventually grasped, seized or pushed along by one of the head carrier and positioners 32 on the main conveyor chain 30. The head of the bird nestles into the carrier and positioners 32 in the manner illustrated in FIGS. 8 and 9.

Figure 2:
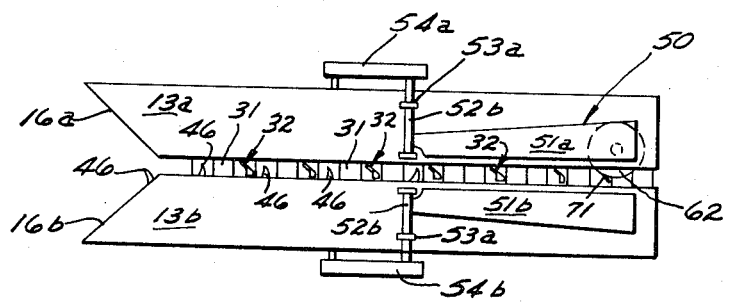
FIG. 2 is a schematic plan view of the apparatus.

At this point, the bird comes under the influence of the pressure plate assembly 50 which, if necessitated by the particular dimensions of the bird, lifts the body section weight away from the overhead conveyor by bearing upwardly against the lower neck portion 94 thereof and tightens the birds in the apparatus such that its head portion comes into abutment with the beads 14a and 14b. The degree of lift exerted upon the bird is controlled by the dimensions and weight of the counter weights 54 and, when the head has been snubbed against the beads 14, the plates 51a and 51b pivot in clockwise fashion as illustrated in FIG. 2 to maintain the bird in that position.

During this period, of course, the head portion of the bird is being propelled through the apparatus at a lineal speed approximately identical to the speed of the overhead conveyor by its abutment with members 32.

Depending upon the length of the neck of the particular bird being operated upon at the moment, the pressure plates 51 may pivot almost into abutment with platforms or decks 13 or take any position between this position and the fully upward pivoted position illustrated in the figures such as FIG. 3. The bird, thus, will always be positioned with its head snubbed against the beads 14 as it comes into cutting relationship with circular knife 62.

The configuration and positioning of the head carrier and positioner member 32 causes the bird's head to assume the position relative to the cutting knife 62 illustrated in FIGS. 8 and 9. That is to say, the transverse positioning of the flat section 33 with respect to the direction of travel of the conveyor assemblies causes the bird's head to rotate in such a fashion that the left side of the bird neck, the side containing both an artery and a vein, will be rotated automatically into the proper cutting position with respect to the knife 62. The turned-over corner 34 of the members 32 eliminates any possibility of the bird getting behind the particular positioner member 32 by which it is being carried as well as further aiding in the positioning of the head.

Immediately prior to coming into contact with the rotating knife 62, the side of the bird's head opposite from that engaged by the member 32 is contacted by the spring loaded retainer bar 71. As the conveyor 30 moves ahead, bar 71 begins to rotate in counterclockwise fashion as viewed in FIG. 5 against the force of spring 73 and, thus, positively maintains the head 91 of the bird in positioning member 32 so that the cut may be properly made.

As the bird comes into contact with the rotating knife, a cut of depth approximately equal to that illustrated in FIG. 8 is made in the neck of the bird, the cut severing both the artery and vein in the bird's neck to insure a thorough bleeding of the carcass. During this time, upward pressure is still being exerted upon the bird by the pressure plates 51 and the head is being compressed into the member 32 by the resilient retainer assembly bar 71. Subsequent to the cut, the lever or bar 71 pivots sufficiently in a clockwise direction as viewed in FIG. 5 to permit the particular member 32 with which it has been associated to pass thereby along with the bird being carried therewith. The bar 71 then pivots under the influence of tension spring 73 to its original position, ready for the next killing cycle. The bleeding bird is thereafter dragged from the apparatus by the overhead conveyor assembly 80 and carried on to a subsequent processing station.

The birds, ordinarily, will have been electrically stunned or the like prior to passage into the apparatus and, therefore, the cutting operation may be carried out smoothly and continuously as the birds pass therethrough. In the event that one of the birds escapes the killing apparatus, processing line need not be haulted as no jamming or the like will be incurred. The bird will merely be dragged across the machine and will be eventually killed by hand at a subsequent processing station.

It is not necessary, ordinarily, for successful operation of the apparatus that the positioner and carrier members 32 be located directly below the shackles 83. It has been found, on the other hand, preferred to provide retainer and carrier members 32 spaced along main conveyor chain 30 at approximately half the space of the overhead shackles 83 on the overhead conveyor assembly 80. Thus, for example, if the shackles 83 are four feet apart, the members 32 might be positioned every two feet as a means of insuring that the head of each bird will be caught in one of the carrier and positioner members 32.

The vertical spacing between the overhead conveyor and the beads 14a and 14b must be such that the head of the shortest bird to be effectively processed hangs below the beads 14 upon entry into the apparatus. The longer necks of larger birds will be compensated for by the lifting action of the pressure plate assembly 50. The upward slope of the main conveyor assembly 20 along its initial travel segment, additionally, will insure that the heads 90 of the birds are properly grasped in the retainer and positioner members 32.

While a prefered embodiment of this invention has been described in detail, it will be readily apparent to those skilled in the art that other embodiments may be conceived and fabricated without departing from the spirit of this specification and the accompanying figures. Such other embodiments are to be deemed as included within the scope of the following claims unless these claims, by their language expressely state otherwise.

The embodiments of the invention in which an exclusive property or privilege is claimed are defined as follows:

1. Apparatus for killing poultry suspended in head-down fashion from a traveling overhead conveyor by suspension means affixed to said overhead conveyor, said apparatus comprising a main conveyor spaced below said overhead conveyor, said main conveyor having a series of head carrier and positioner means affixed thereto for movement therewith, one of said carrier and positioner means being positioned generally below each of said suspension means, said overhead and main conveyors being moved at generally identical lineal rates; means adjacent said main conveyor for cutting said birds at the neck as they are propelled thereby by said overhead and main conveyors; elongate retainer means positioned above said main conveyor and running generally parallel thereto, said retainer means forming an elongated neck slot above said main conveyor through which the necks o said poultry extend as they are conveyed by said main and overhead conveyors, the width of said slot being less than the dimensions of the heads of the poultry to be killed permitting the heads to be snubbed into abutment with said retainer means by an upward pressure exerted upon the body sections of the poultry without pulling the poultry head free from said carrier and positioner means; and means for engaging said poultry and exerting an upward thrust thereagainst as they are conveyed by said main and overhead conveyors to snub the heads thereof into abutment with said retainer means prior to contact of the poultry by said cutting means.

2. The apparatus as set forth in claim 1 wherein said engaging and exerting means comprises a pair of spaced members pivotably affixed to said apparatus so as to form an elongated space therebetween generally above the slot formed by said retainer means, said space being narrower than the forward breast sections of the poultry to be killed, said poultry and exerting an upward thrust thereagainst as in the direction of movement of said conveyors.

2. The apparatus as set forth in claim 2 wherein said members are biased upwardly by counter weights, and which further comprises means for slaving said members for movement together whereby they each must assume the same angular relationship with respect to said apparatus.

4. The apparatus as set forth in claim 1 wherein said main conveyor slopes upwardly toward said overhead conveyor at the initial section thereof.

5. The apparatus as set forth in claim 4 which further comprises an infeed guide conveyor having a series of finger-like members affixed thereto, said finger-like members protruding into general vertical registry with the slot between said retainer means and traveling therealong in the same direction and same proximate speed as said main conveyor.

6. The apparatus as set forth in claim 5 which further comprises converging guide aprons at the input extremity of said apparatus for guiding said poultry into lingitudinal alignment with said main conveyor and the slot formed by said retainer means as they are conveyed into said apparatus by said overhead conveyor.

7. The apparatus as set forth in claim 1 wherein said carrier and positioner means includes a first portion upstanding from said conveyor and positioned transversely to the direction of movement thereof.

8. The apparatus as set forth in claim 7 wherein said first portion is substantially flat.

9. The apparatus as set forth in claim 7 wherein said carrier and positioner means includes a second portion curving out of the general plane of said first portion to form a generally curved receptacle opening toward the direction of movement of said conveyors for receiving the heads of said poultry.

10. The apparatus as set forth in claim 9 which further comprises means for pressing the head of the bird into abutment with said carrier and positioner means during the cutting operation.

11. The apparatus as set forth in claim 10 wherein said pressing means comprises a bar-like member extending across said conveyor adjacent said cutting means, the vertical height of said bar-like member being such that it engages and bears against the heads of said poultry to compress them into said carrier and positioner means in predetermined position during contact with said cutting means, said bar-like member being pivotably mounted to said apparatus and biased into conveyor crossing position, said member pivoting resiliently out of crossing position under the influence of the movement of said main conveyor and bird, sliding by the bird after cutting thereof and resiliently returning to its original conveyor crossing position.

12. The apparatus as set forth in claim 10 wherein said cutting means comprises a rotatable blade member positioned adjacent the slot formed by said retainer means, a portion of said blade member extending into said slot.

13. The apparatus as set forth in claim 10 wherein one side of said retainer means has a gap therein, said blade member extending into said slot through said gap.

14. The apparatus as set forth in claim 1 wherein said cutting means comprises a rotatable blade member positioned adjacent the slot formed by said retainer means, a portion of said blade member extending into said slot.

15. The apparatus as set forth in claim 14 wherein one side of said retainer means has a gap therein, said blade member extending into said slot through said gap.

16. Apparatus for killing poultry suspended in head-down fashion from a traveling overhead conveyor by suspension means affixed to said overhead conveyor, said apparatus comprising a main conveyor spaced below said overhead conveyor, said main conveyor having a series of head carrier and positioner means affixed thereto for movement therewith, each said carrier and positioner means including a first portion upstanding from said main conveyor and positioned transversely to the direction of movement thereof and a second portion curving out of the general plane of said first portion to form a generally curved receptacle opening toward the direction of movement of said conveyors for receiving the heads of said poultry, one of said carrier and positioner means being positioned generally below each of said suspension means, said overhead and main conveyors being moved at generally identical lineal rates and means adjacent said main conveyor for cutting said birds at the neck as they are propelled thereby by said overhead and main conveyors.

17. The apparatus as set forth in claim 16 wherein said first portion is substantially flat.

18. The apparatus as set forth in claim 16 wherein said cutting means comprises a rotatable blade member.

19. The apparatus as set forth in claim 18 which further comprises means for pressing the head of the bird into abutment with said carrier and positioner means during the cutting operation.

20. The apparatus as set forth in claim 19 wherein said pressing means comprises a bar-like member extending across said conveyor adjacent said cutting means, the vertical height of said bar-like member being such that it engages and bears against the heads of said poultry to compress them into said carrier and positioner means in predetermined position during contact with said cutting means, said bar-like member being pivotably mounted to said apparatus and biased into conveyor crossing position, said member pivoting resiliently out of crossing position under the influence of the movement of said main conveyor and bird, sliding by the bird after cutting thereof and resiliently returning to its original conveyor crossing position.

21. The apparatus as set forth in claim 1 which further comprises means for pressing the head of the bird into abutment with said carrier and positioner means during the cutting operation.

References Cited

UNITED STATES PATENTS

| 2,152,083 | 3/1939 | Onorato et al. | 17—11 |
| 2,210,376 | 8/1940 | Onorato et al. | 17—11 |
| 2,306,773 | 12/1942 | Biffinger | 17—11 |
| 2,993,228 | 7/1961 | Zebarth | 17—12 |
| 3,201,823 | 8/1965 | Mathews | 17—11 |
| 3,277,514 | 10/1966 | Hooley | 17—11 |

LUCIE H. LAUDENSLAGER, Primary Examiner

PO-1050
(5/69)

UNITED STATES PATENT OFFICE
CERTIFICATE OF CORRECTION

Patent No. 3,522,623        Dated August 4, 1970

Inventor(s) H. M. Pyron

It is certified that error appears in the above-identified patent and that said Letters Patent are hereby corrected as shown below:

Column 4, line 20;
"comprises a suitably pournalled" should be --- comprises a suitably journalled --- ;

Column 4, line 32;
"This necessities," should be --- This necessitates ---;

Column 7, line 21;
"said poultry into lingitudinal" should be --- said poultry into longitudinal ---;

Column 7, line 1;
"said poultry and exerting an upward thrust thereagainst as" should be --- said members being biased upwardly in ramp-like fashion ---;

Column 7, line 3;
"2" (first occurrence) should be --- 3 ---.

SIGNED AND
SEALED
NOV 17 1970

(SEAL)
Attest:

Edward M. Fletcher, Jr.
Attesting Officer

WILLIAM E. SCHUYLER, JR.
Commissioner of Patents